United States Patent [19]

Kime

[11] Patent Number: 4,727,427
[45] Date of Patent: Feb. 23, 1988

[54] ELECTRONIC IMAGING CAMERA SYSTEM WITH PHOSPHOR IMAGE RECEIVING AND STORING DEVICE

[75] Inventor: Milford B. Kime, Cambridge, Mass.

[73] Assignee: Polaroid Corporation, Cambridge, Mass.

[21] Appl. No.: 922,253

[22] Filed: Oct. 23, 1986

[51] Int. Cl.⁴ ............................................... H04N 5/30
[52] U.S. Cl. .................................... 358/217; 358/211; 250/213 VT
[58] Field of Search ............................. 358/217, 211; 250/213 VT

[56] References Cited

U.S. PATENT DOCUMENTS

| | | | |
|---|---|---|---|
| 4,024,390 | 5/1977 | Bosserman et al. | 250/213 VT |
| 4,024,391 | 5/1977 | Bosserman et al. | 250/213 VT |
| 4,274,028 | 6/1981 | Frame | 250/504 R |
| 4,339,659 | 7/1982 | Johnson | 250/213 VT |
| 4,365,150 | 12/1982 | Bateman | 250/207 |
| 4,433,236 | 2/1984 | Shimada | 250/213 VT |
| 4,471,378 | 9/1984 | Ng | 358/217 |
| 4,555,731 | 11/1985 | Zinchuk | 358/209 |
| 4,564,760 | 1/1986 | Noguchi et al. | 250/327.2 |

Primary Examiner—Jin F. Ng
Assistant Examiner—Stephen Brinich
Attorney, Agent, or Firm—Edward S. Roman

[57] ABSTRACT

An electronic image camera system including an image receiving and storing device therefor comprises a stimulable phosphor, and a multiple electrode configuration associated therewith for storing a plurality of images therein in accordance with the selective energization of selected ones of the plurality of electrodes, the images being selectively retrievable in an ordered sequence by addressing the stimulable phosphor with a stimulating light in regions immediately adjacent selected ones of the electrodes.

14 Claims, 4 Drawing Figures

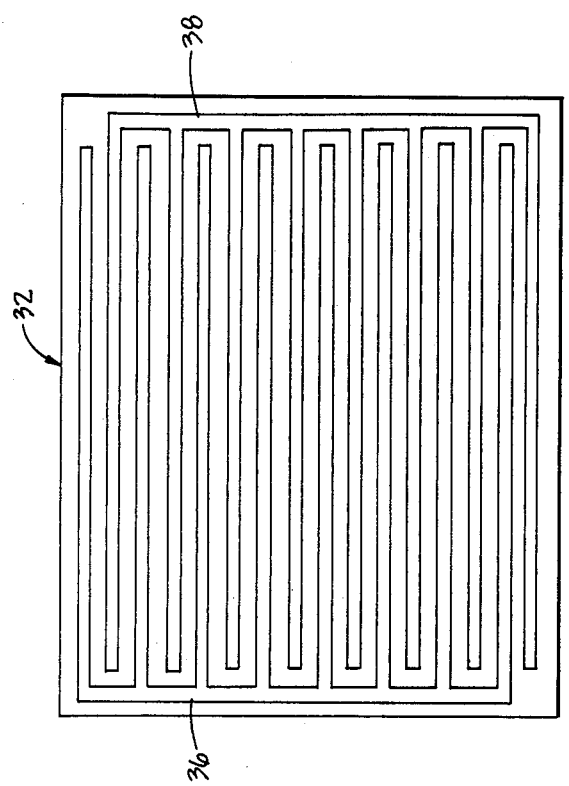
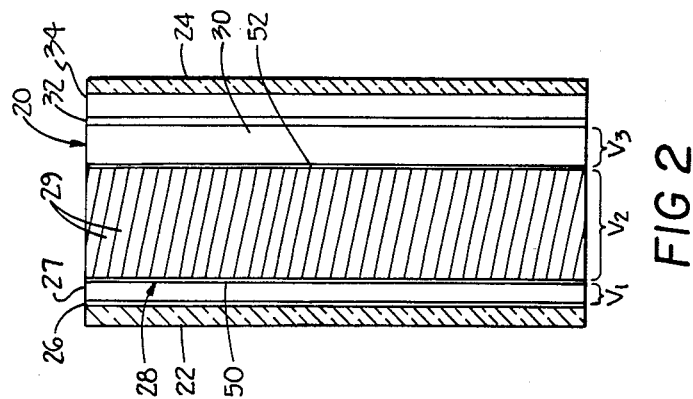
FIG 3
FIG 2

ELECTRONIC IMAGING CAMERA SYSTEM WITH PHOSPHOR IMAGE RECEIVING AND STORING DEVICE

BACKGROUND OF THE INVENTION

1. Field of the Invention

This invention relates generally to an electronic imaging camera system and image receiving and storing apparatus for use therewith and, more particularly, to an electronic imaging camera system including an image receiving and storing device embodying a selectively addressable stimulable phosphor.

2. Description of the Prior Art

Electronic imaging cameras for recording high quality still images are now well known in the art. In order to provide photographic quality reproductions, such still image electronic cameras require a high resolution image sensing array comprising a substantially higher number of pixels that is required for a standard home television image. This high resolution leads to data transfer problems particularly since the transfer of photographic image data to be stored on a digital recording medium cannot be practically completed in a standard television frame of 1/30th of a second. The high number of image sensing pixels required to make a photographic quality still print imposes additional memory requirements which are traditionally satisfied by buffer memories substantially increasing the cost, size and power consumption of the electronic camera.

A number of image sensing pixels generally required for an electronic camera to produce a photographic quality still print is in excess of 1,000,000 pixel sensing areas. Without the use of large and costly frame buffer memories this amount of data cannot be quickly transferred from the high resolution image sensing array for storage on a magnetic tape or disk. Slow data transfer rates for each image might make it difficult or impossible to record succeeding still images in rapid succession.

Therefore, it is a primary object of this invention to provide an electronic imaging camera system in which high resolution still images may be captured in rapid succession and temporarily stored in an image receiving and storing device prior to transfer to a magnetic storage medium at relatively slow data rates.

Other objects of the invention will, in part, be obvious and will, in part, appear hereinafter. The invention accordingly comprises the mechanism and system possessing the construction, combination of elements and arrangement of parts which are exemplified in the following detailed disclosure.

SUMMARY OF THE INVENTION

An electronic image camera apparatus comprises an objective lens for focusing scene light received from a subject to be recorded and means for defining an aperture for admitting the focused scene light to the camera apparatus and for determining an exposure interval. Means are provided which respond to the scene light received by way of the objective lens and aperture defining means for converting the photons of the scene light into electrons representative of an image of the scene to be recorded. Electron multiplier means are provided for receiving electrons from the converting means and intensifying the electron representation of the image of the subject to be recorded. The intensified electrons thereafter exit from an output side of the multiplier means. A plurality of spaced apart electrodes are disposed in an interleaved pattern on a plane spaced apart from the output side of the multiplier means so as to define an electronic accelerating gap between the output side of the multiplier means and each one of the interleaved electrodes which is energized. Means are provided for energizing a selected different one of the interleaved electrodes for each exposure interval so that the electrons representative of each subject are accelerated from the output side of the multiplier means toward that one of the interleaved electrodes selectively energized. A stimulable phosphor screen is disposed adjacent the plane of the interleaved electrodes for storing the electrons accelerated by the interleaved electrodes in the pattern of each one of the interleaved electrodes so energized. Means are provided for stimulating the stimulable phosphor in the pattern of selected ones of the interleaved electrodes so as to cause the stimulable phosphor to emit the subject defining light in the pattern of the selected electrodes. Means are also provided for thereafter sensing the subject defining light emitted by the stimulable phosphor screen and converting the sensed subject defining light to an electronic information signal representative of the subject. The electronic information signal is thereafter readily recordable and convertible to a visual display of the subject.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in conjunction with the accompanying drawings wherein:

FIG. 2 is a side view of the image receiving and storing device of this invention used in the camera system of FIG. 1;

FIG. 3 is a plan view for an electrode configuration for use in the device of FIG. 2.

DESCRIPTION OF THE PREFERRED EMBODIMENT

Figure 1:
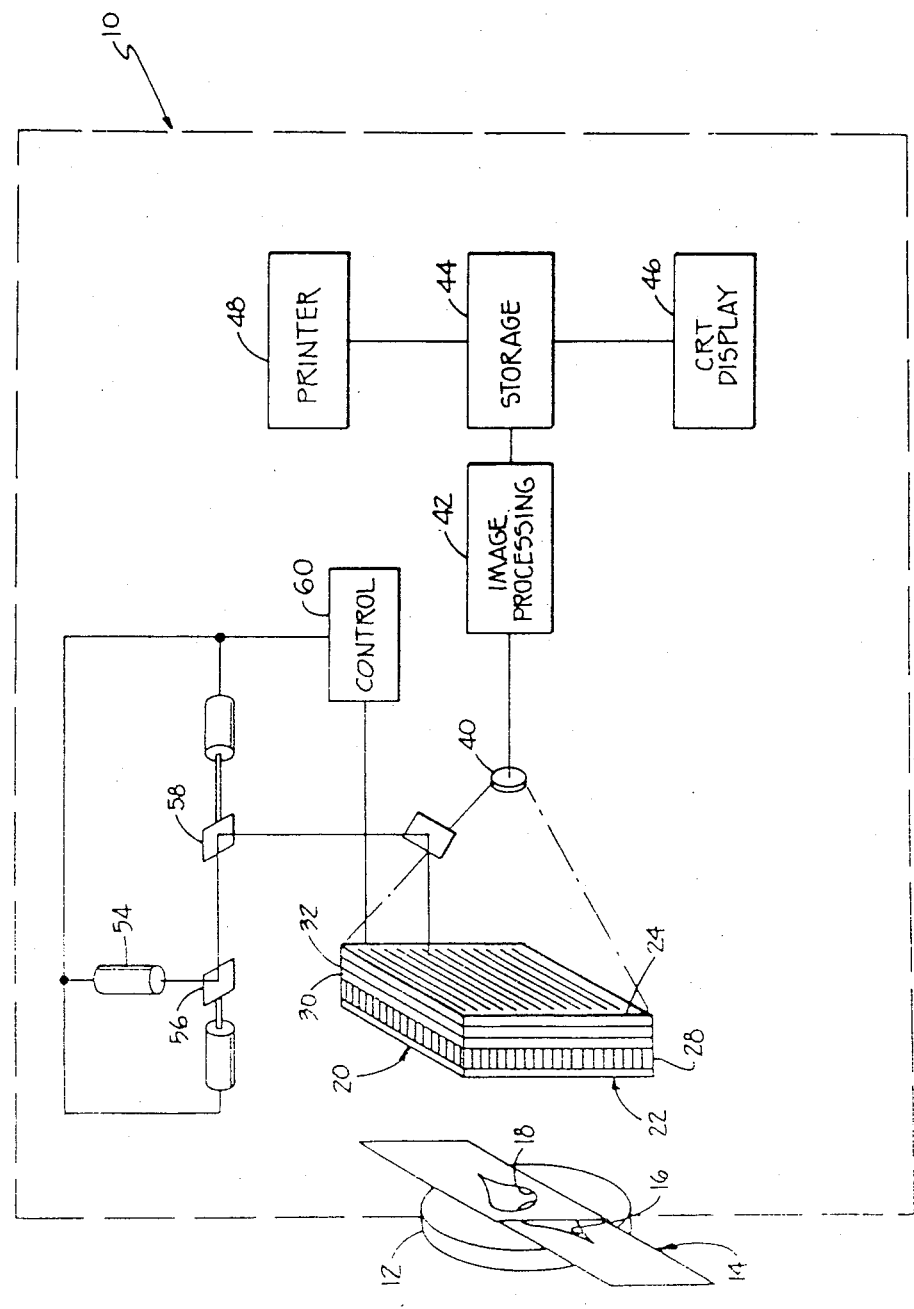
FIG. 1 is a block diagram of the electronic imaging camera system of this invention.

Referring to FIG. 1 there is shown a block diagram for an electronic imaging camera constructed in accordance with the present invention and comprising an objective lens 12 for focusing scene light rays received from a subject to be recorded by the camera 10. The scene light rays focused by the objective lens 12 are subsequently transmitted by way of a pair of scanning shutter blades 14 comprising respectively primary scene light admitting apertures 16 and 18 which are moved in mutually opposing directions to overlap each other and thereby collectively define a primary scene light admitting aperture in a manner as is well known in the camera art.

The scene light rays transmitted by way of the scanning shutter blades 14 are thereafter directed to impinge upon an image receiving and storing device as shown generally at 20 and which may be best understood by referring to the cross-sectional view of FIG. 2. The image receiving and storing device 20 comprises on the inlet side thereof, a transparent glass plate 22 on which is disposed a conventional photocathode 26 for converting the photons of the incident image scene light to electrons representative of an image of the subject being recorded. The photocathode may be deposited over a fine lithographically deposited conductive mesh inorder to anticipate for high surface currents. The electrons emanating from the photocathode 26 are proximity focused across a vacuum gap 27 by voltage $V_1$ prior to impinging upon a microchannel plate 28 which operates in a well-known manner to intensify the electron representation of the image of the subject being recorded.

Microchannel plates are electron multiplying, vacuum electronic devices frequently used in image intensifier tubes for intensification of an optical image. Microchannel plates are characterized by high electron gain, low noise, high spatial resolution, high speed, small weight, relatively low power consumption, and long operational life. Physically the microchannel plate 28 may be made of lead silicate glass and is a two-dimensional array of hollow glass fibers 29 fused together.

The inside surfaces of the hollow glass fibers 29 are covered respectively by a resistive secondary emission film as is well known in the art. The resistive secondary emission film electrically connects to an input plate 50 and an output plate 52 which may comprise respectively thin electron permeable nickel chrome electrodes. In some cases, the thin plates 50, 52 may be apertured, the apertures being aligned with the individual hollow glass fibers 29 thereby allowing electrons from the photocathode 26 to readily pass into the hollow fibers 29 and the secondary electrons produced therein to exit the microchannel plate 28. The plates 50, 52 operate to effect application of a positive voltage $V_2$ which, for example, may be in the order of 650 volts between the entrance and the exit of the microchannels.

The hollow glass fibers 29 forming the microchannels preferably have an inside diameter in the order of 5 to 45 microns, but may be even smaller depending on the resolution sought to be achieved. The channel line-to-diameter ratio (L/D) is typically in the order of 40–48 for conventional plates which are suitable for practicing the present invention. It will be readily understood that the smaller the diameter of the hollow glass fibers the greater the resolution possible. In addition, as shown in FIG. 2, the individual microchannels defined by the hollow glass fibers 29 preferably are not perpendicular to the input and output surfaces but instead are positioned at a 5° to 10° bias angle as illustrated by the fibers 29. The purpose of the bias angle is to assure a first electron impact near to the channel entrance, reduce ion feedback and improve the uniformity of image transmission. As is well known in the art, curved channels could alternatively be used to achieve the aforementioned purpose.

Electrons exiting from the microchannel plate 28 are accelerated across a gap 30 having a positive voltage $V_3$ applied thereacross. The voltage $V_3$ which may be pulsed is sufficient to accelerate the electrons across the gap 30 to impinge upon a stimulable phosphor screen 34, the input side of which is overlayed with a plurality of spaced apart electrodes 32 as best shown in FIG. 3. Field shaping electron optics (not shown) as is well known in the art can be used in the gap 30 for enlargement thereby permitting the stimulable phosphor screen 34 to be substantially larger than the cross-sectional area of the microchannel plate 28. The electrodes 32 comprise a first elongated electrode 36 interleaved in substantially parallel relationship with respect to a second electrode 38. As is readily apparent, the electrodes 36, 38 are arranged in a pattern of straight, spaced apart stripes, each set of stripes of which can be energized independently of the other set of stripes so as to create separate and distinct rasters in the manner of this invention as will become more apparent from the following discussion. Although only two interleaved electrodes 36 and 38 are illustrated for purposes of this example, it will be readily understood that substantially more than two electrodes may be arranged in the interleaved repeating pattern of straight spaced apart stripes shown in FIG. 3. In addition, the electrodes 32 may be made of thin, electron permeable nickel chrome mesh in the manner previously discussed in regard to the input and output plates 50, 52 of the microchannel plate 28. In order to prevent voltage breakdown between adjacent electrodes, the phosphor/electrode structures may be deposited in grooves (not shown) on a substrate in a manner as is well-known in the art.

The stimulable phosphor screen 24 is of a well-known type which emits light of intensity corresponding to the energy stored therein when stimulated with stimulating rays. The stimulating light rays must be selected to have a different wavelength from that of the light emitted by the phosphor screen upon stimulation. For the example herein described, an infrared or red laser beam provided from a laser source 54 is chosen to stimulate the phosphor screen 34 so as to cause the phosphor screen to emit light in the blue to green visible spectrum. The stimulating laser beam from the laser 54 is raster scanned across the face of the stimulable phosphor screen 35 in the manner of this invention in the X and Y directions by galvanometer mirrors 56 and 58 respectively under the control of signals provided from a control circuit 60. Although X and Y galvanometer mirrors are shown for effecting the raster scan of the laser beam, it will be well understood that other well-known means for raster scanning the laser beam in the X, Y directions could also be suitably employed.

A photodetector 40 detects the subject defining light emitted by the stimulable phosphor screen 34 upon stimulation by the laser beam to provide an electronic information signal which may be subsequently processed and converted by an image processing circuit 42. The signal output from the image processing circuit 42, in turn, is directed for storage as shown by block 44 by recording on a magnetic or optical disk or tape. Such a disk may comprise a standard floppy disk as is well known in the video imaging art. The stored signal can thereafter be directed to a printer 48 for recording a hard copy of the subject scene. The printer 48 may be any one of a wide variety of copiers such as photographic, thermal, ink jet, etc. The stored signal can also be directed to a CRT display 46 to provide a visible image of the subject scene.

A recording interval for a first subject scene may begin in an ordinary manner by adjusting the focus of the objective lens 12 and setting the aperture size and exposure interval with the scanning shutter blade 14. The photons of the scene light incident to the photocathode 26 are converted to electrons and thereafter proximity focused by the gap voltage $V_1$ to the microchannel plate 28 where the voltage $V_2$ produces a high electron gain. Electrons emanating from the microchannel plate are thereafter accelerated across the gap 30 by the voltage $V_3$ provided by energizing the electrode 36.

The electrode 38 remains either unenergized or energized to a voltage less than or opposite in polarity to the voltage to which the electrode 36 is energized and hence the electrons are directed to the higher voltage electrode 36 from whence they produce trap sites in the areas of the stimulable phosphor screen 34 adjacent thereto. Since the electrons are deflected toward the higher voltage electrode 36 and away from the lower voltage electrode 38, it becomes readily apparent that the trap sites are produced substantially in areas of the stimulable phosphor screen 34 immediately adjacent the higher voltage electrode 36 and that substantially no trap sights are produced in the areas of the stimulable phosphor screen 34 immediately adjacent the lower voltage electrode 38. Thus, in this manner, a single first image of a subject scene is stored in the stimulable phosphor screen 34 in a series of raster lines defined by the geometry of the electrode 36.

The image stored in this manner may be retrieved immediately by raster scanning the stimulable phosphor screen 34 with the beam from the laser 54 which raster scans the stimulable phosphor screen 34 only in those areas immediately opposite the electrode 36. As prviously discussed, the beam is raster scanned by the galvanometer mirrors 56, 58 under the control of the signal provided from the control circuit 60 which also operates to energize the electrode 36. Once stimulated in this manner, the phosphor screen 34 emits image defining scene light which is subsequently detected by the photodetector 40 for conversion to electronic information signals which are subsequently processed by the image processing circuit 42. The signals are then stored on a magnetic medium at 44 and may thereafter be printed to provide a hard copy by the printer 48 or displayed on the CRT display 46 as previously discussed.

However, in situations where it is desirable to record a second subject scene in rapid succession from the first scene prior to the time in which it would take to stimulate the phosphor screen 28 and retrieve the image of the first subject scene therefrom, it is possible to implement a second succeeding exposure interval while maintaining the first image stored in the stimulable phosphor screen 34. This is accomplished through the control circuit 60 either deenergizing the electrode 36 or energizing the electrode 36 to the lower voltage and energizing the electrode 38 to the higher voltage so that the electrons converted by the photocathode 26 from the photons of the light from the second subject scene and subsequently enhanced by the microchannel plate 28 are accelerated by the electrode 38 across the gap 30 to establish trap sites in the stimulable phosphor screen 34 in those areas immediately adjacent the electrode 38. Thus, as is readily apparent, the electrons from the scene light of the second scene establish trap sites in the stimulable phosphor screen 34 in longitudinal raster lines interleaved with the trap sites previously established by electrons from the light of the first subject scene.

In this manner, it is possible for the stimulable phosphor screen 34 to store two images which may thereafter be retrieved by stimulating the phosphor screen 34 with the beam from the laser 54 controlled by the control circuit 60 to scan appropriate raster lines corresponding to the selected electrode. Thus, if the first image is to be retrieved, the galvanometer mirrors 56, 58 are controlled by circuit 60 to raster scan across the phosphor screen 34 in those areas immediately adjacent the electrode 36; while in like manner, if the second subject scene is to be retrieved, the galvanometer mirrors 56, 58 are controlled to scan the laser beam across those areas of the phosphor screen 34 immediately adjacent the second electrode 38. In this manner, the first and second images may be retrieved in sequence for storage and subsequent display in the aforementioned manner. The first and second images may also be of the same scene, but recorded through different color separation filters in order to provide a color acquisition capability. Although only two electrodes 36, 38 have been shown and described for storing two images, it is readily apparent that additional electrodes may be interleaved with those shown to accommodate the storage in a stimulable phosphor screen 34 of more than two images. The image processing circuit 42 may also be utilized to reduce or eliminate cross-talk between the first and second images.

Figure 4:
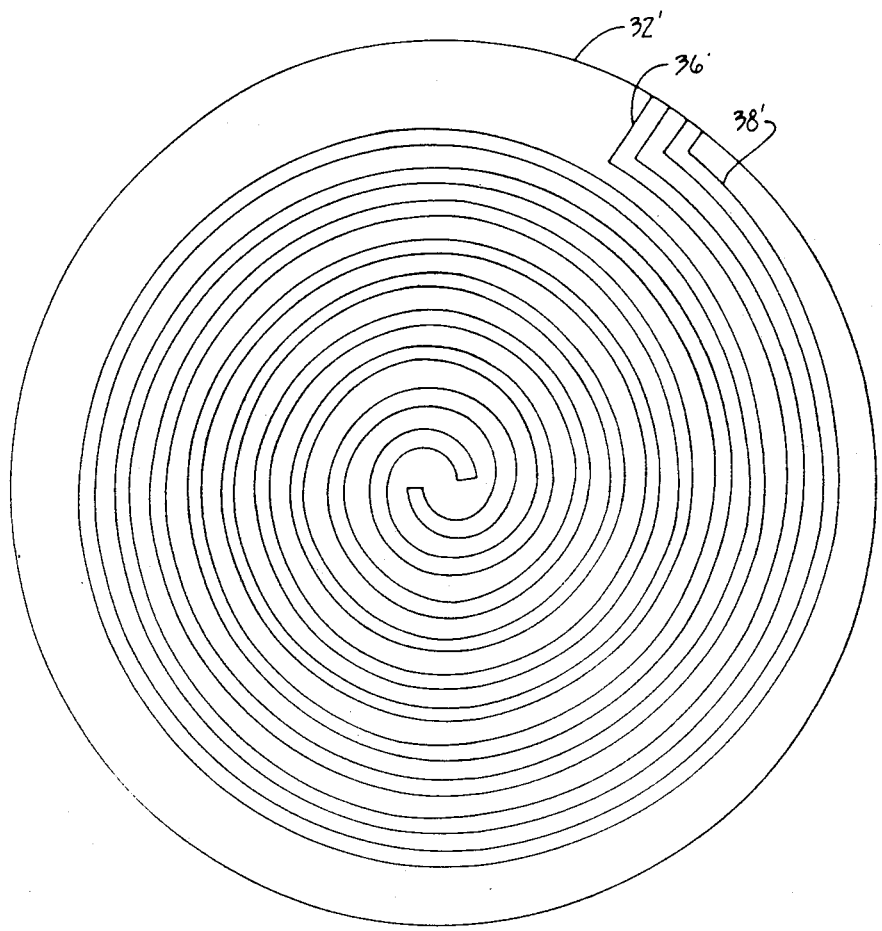
FIG. 4 is a plan view for an alternate embodiment of the electrode configuration of FIG. 3.

Referring now to FIG. 4, there is shown an alternate arrangement whereby interleaved electrodes 36', 38' are arranged in a pattern of spaced apart helixes. Again, only two electrodes are shown by way of example, but it would be readily apparent that more than two electrodes could be arranged in the same pattern of spaced apart helixes. The helical electrodes 36', 38' are disposed in the aforementioned manner on the input surface on a circular stimulable phosphor screen disposed for rotation about its center axis. The stimulating laser beam is thus moved radially along the plane of the phosphor screen to address those areas of the screen immediately adjacent a selected one of the electrodes in a manner as is more fully disclosed in U.S. Pat. No. 4,564,760 entitled "Radiation Image Readout Apparatus", issued Jan. 14, 1986.

It will also be readily understood that other interleaved electrode configurations could also be utilized in conjunction with the stimulable phosphor screen.

In addition, the electron representation of the subject may be intensified by an appropriately biased accelerating gap in place of the microchannel plate 28.

Other embodiments of the invention, including additions, subtractions, deletions and other modifications of the preferred disclosed embodiments of the invention will be obvious to those skilled in the art and are within the scope of the following claims.

What is claimed is:

1. An electronic image camera apparatus including an objective lens for focusing scene light received from each of a plurality of succeeding subjects to be recorded and means for defining an aperture for admitting the focused scene light to the camera apparatus and for determining an exposure interval for each one of the plurality of succeeding subjects, said camera comprising:

means responsive to the scene light received by way of the objective lens and aperture defining means for converting the photons of the scene light into electrons representative of an image of the subject to be recorded;

means for receiving the electrons from said converting means and intensifying the electron representation of the image of the subject to be recorded, said intensified electrons exiting from an output side of said intensifier means;

a plurality of electrodes spaced apart with respect to each other and disposed in an interleaved pattern on a plane spaced apart from said output side of said intensifying means;

means for energizing a selected one of said interleaved electrodes for each exposure interval so as to define an electron accelerating gap between the output side of said intensifying means and that one of said electrodes selected for energization whereby electrons representative of each subject are accelerated from the output side of said intensifying means toward that one of the interleaved electrodes selected for energization;

a stimulable phosphor disposed adjacent the plane of said interleaved electrodes for storing the electrons accelerated by said interleaved electrodes in the pattern of each one of said interleaved electrodes so energized;

means for stimulating the stimulable phosphor in the pattern of selected ones of said interleaved electrodes so as to cause said stimulable phosphor to emit subject defining light in the pattern of said selected electrodes; and means for sensing the subject defining light emitted by said stimulable phosphor and converting said sensed subject defining light to an electronic information signal representative of the subject, said electronic information signal being readily recordable and convertible to a visual display of the subject.

2. The camera apparatus of claim 1 wherein said interleaved electrodes comprise a plurality of elongated electrodes arranged in substantially parallel relationship with respect to each other in a repeating pattern.

3. The camera apparatus of claim 2 wherein said elongated electrodes are arranged in a pattern of straight spaced apart stripes.

4. The camera apparatus of claim 2 wherein said elongated electrodes are arranged in a pattern of helixes spaced apart with respect to each other.

5. The camera apparatus of claim 2 wherein said stimulable phosphor comprises a stimulable phosphor screen and said interleaved electrodes are disposed on the side of said stimulable phosphor screen which receives said accelerated electrons.

6. The camera apparatus of claim 5 wherein said means for converting the photons of the scene light into electrons comprises a photocathode and said intensifying means comprises a microchannel plate.

7. The camera apparatus of claim 6 wherein said photocathode, microchannel plate, interleaved electrodes, and stimulable phosphor screen are vacuum sealed within exterior glass plates.

8. An image receiving and storing apparatus for use in an electronic imaging camera, said apparatus comprising:

means responsive to scene light received by the camera for converting the photons of the scene light into electrons representative of an image of the scene to be recorded by the camera;

means for receiving the electrons from said converting means and intensifying the electron representation of the image of the scene to be recorded by the camera, said intensified electrons exiting from an output side of said intensifier means;

a plurality of electrodes spaced apart with respect to each other and disposed in an interleaved pattern on a plane spaced apart from said output side of said intensifying means so as to define an electron accelerating gap between the output side of said intensifying means and each one of said interleaved electrodes upon its energization; and a stimulable phosphor disposed adjacent the plane of said interleaved electrodes for storing the electrons accelerated by said interleaved electrodes in the pattern of each one of said interleaved electrodes so energized.

9. The image receiving and storing apparatus of claim 8 wherein said interleaved electrodes comprise a plurality of elongated electrodes arranged in substantially parallel relationship with respect to each other in a repeating pattern.

10. The image receiving and storing apparatus of claim 9 wherein said elongated electrodes are arranged in a pattern of straight spaced apart stripes 11. The image receiving and storing apparatus of claim 9 wherein said elongated electrodes are arranged in a pattern of helixes spaced apart with respect to each other.

12. The image receiving and storing apparatus of claim 9 wherein said stimulable phosphor comprises a stimulable phosphor screen and said interleaved electrodes are disposed on the side of said stimulable phosphor screen which receives said accelerated electrons.

13. The image receiving and storing apparatus of claim 12 wherein said means for converting the photons of the scene light into electrons comprises a photocathode and said intensifying means comprises a microchannel plate.

14. The image receiving and storing apparatus of claim 12 wherein said photocathode, microchannel plate, interleaved electrodes, and stimulable phosphor screen are vacuum sealed within exterior glass plates.

* * * * *